United States Patent [19]
McSparran

[11] 3,719,868
[45] March 6, 1973

[54] ALTERNATING CURRENT POWER SOURCE OF A WHEEL SLIP CONTROL SYSTEM

[75] Inventor: Lloyd W. McSparran, Erie, Pa.

[73] Assignee: General Electric Company, Erie, Pa.

[22] Filed: July 12, 1971

[21] Appl. No.: 161,762

[52] U.S. Cl. .................318/52, 318/144, 318/148
[51] Int. Cl. .........................H02p 5/50, B61c 15/08
[58] Field of Search.........................318/52, 144, 148

[56] References Cited

UNITED STATES PATENTS

| | | | |
|---|---|---|---|
| 3,183,422 | 5/1965 | Stamm | 318/144 X |
| 3,340,448 | 9/1967 | Thiessen | 318/148 X |
| 3,296,510 | 1/1967 | Stamm | 318/144 X |
| 2,543,622 | 2/1951 | Edwards et al. | 318/52 |

Primary Examiner—T. E. Lynch
Attorney—Walter C. Bernkopf et al.

[57] ABSTRACT

A wheel slip control system for a traction vehicle driven by motors receiving power from a traction alternator through rectifiers, the system having a plurality of current measuring devices each connected to the armature of one of the motors and adapted to provide a signal responsive to the armature current, wherein the signals are employed to control the output of the traction alternator through its excitation system. The current measuring device requires a-c power of a magnitude proportional to armature current which is provided by a current transformer having its primary connected to the traction alternator output and its secondary connected to the current measuring device.

6 Claims, 3 Drawing Figures

INVENTOR.
LLOYD W. McSPARRAN
BY Walter C. Bernkopf
HIS ATTORNEY

ALTERNATING CURRENT POWER SOURCE OF A WHEEL SLIP CONTROL SYSTEM

BACKGROUND OF THE INVENTION

This invention relates generally to wheel slip control systems and more particularly to an arrangement for providing a-c current of appropriate magnitude to current measuring devices used in a traction vehicle wheel slip control system.

In the operation of a self-propelled rail vehicle such as a diesel electric locomotive having a plurality of electric traction motors separately connected to the driving axles, one pair of wheels connected to an axle sometimes slips on the track. This wheel slippage may be caused when rapid acceleration is attempted or under heavy load conditions or when dynamic braking is attempted. It may also occur at high speeds due to track condition, track irregularities, vibration, etc. When this slippage occurs during motoring, the motor driving the slipping axle accelerates to a higher speed than the other motors and may be damaged due to the high resultant mechanical stresses. Furthermore, when the traction motors are connected for energization in either series or parallel circuit relation, the slipping axle relieves its connected motor of any substantial portion of the load so that the remaining motors connected to the non-slipping axles are subject to higher currents and are in turn liable to cause additional wheels to slip. It is therefore, desirable in the design of such vehicles to provide for the detection of wheel slippage, the detecting device being connected to either reduce the energization of the motor connected to the slipping axle or to merely give an indication to the engineman so that he can manually reduce the excitation.

One method of sensing wheel slip is to compare the axle speeds of the vehicle, and to apply the differences to control the motor speeds. Axle generators are installed on axles with the generated current providing an indication of axle speed. Problems encountered with this method include critical tolerances of wheel diameters as well as mechanical abuse from rail joints and wayside protrusions. In addition, this scheme is not as effective at low speeds, when wheel slippage generally occurs due to the locomotive's higher tractive effort capability, as it is at high speeds.

Another method that has long been in use is that of measuring and comparing motor armature currents, since the speed and armature current of the motor is directly related to the axle speed. This method is described in U.S. Pat. No. 2,543,622 to Martin A. Edwards, issued on Feb. 27, 1951 and assigned to the assignee of the present application. A plurality of reactors are employed with each one having control windings responsive to motor current, and primary windings connected to an a-c power source, wherein the output from the primary winding is responsive to the magnitude of current in the control windings, thus providing control signals indicative of individual wheel axle speeds. Various methods can then be employed to compare the individual signals and to subsequently reduce the power output until wheel slippage ceases.

Historically, the a-c power required in the primary winding circuit has been provided by an auxiliary alternator, a provision which is not only expensive, but which also has the disadvantage of having the voltage vary with changes in engine speed, a factor which may cause a variance in the accuracy of the current measuring reactor.

Another alternative in providing a power source is to use a voltage transformer having its primary winding connected to the output leads of the traction alternator. One disadvantage to this approach is that the traction alternator voltage will vary over a 10 to 1 range throughout the speed range of the locomotive. The current measuring reactors cannot measure accurately over such a wide range in excitation voltage.

It is, therefore, an object of this invention to provide in a wheel slip control system for traction vehicles, for an a-c power source to be applied to a plurality of current measuring reactors.

Another object of this invention is the provision for an a-c power source for equipment requiring a-c power only when the alternator of a locomotive delivers appreciable current to the traction motors, such as for current comparison wheel slip systems.

Yet another object of this invention is the provision in a traction vehicle wheel slip control system for eliminating the need for an auxiliary alternator to supply a-c power to a plurality of current measuring reactors.

Still another object of this invention is the provision in a traction vehicle wheel slip control system for an a-c power source which is practical, economical and extremely functional in use.

These objects and other features and advantages become more readily apparent upon reference to the following description when taken in conjunction with the appended drawings.

In the drawings as hereinafter described, a preferred embodiment is depicted; however, various other modifications and alternate constructions can be made thereto without departing from the true spirit and scope of the invention.

SUMMARY OF THE INVENTION

This invention relates to an a-c power source to be applied to the primary windings of a plurality of current measuring reactors, wherein the control winding of each one of the reactors is connected in the circuit with a d-c drive motor of a traction vehicle, and the a-c output from each of the reactors is variably responsive to its associated motor current, thereby providing signals to be compared for the determination and control of wheel slippage in the traction vehicle. The power source comprises a current transformer having its primary windings connected serially in one of the traction alternator output lines and the secondary windings thereof coupled with the primary windings of the current measuring reactors. Provision is made for limiting the voltage from the current transformer by connecting two terminals of a bridge circuit in parallel with one of the secondary windings, and connecting a reference voltage, such as from a battery, across the other two terminals of the bridge.

The current measuring reactors require an a-c current which is proportional to the motor current, and the output of the current transformer fulfills this requirement since it is also proportional to the motor current. In this way, there is always adequate power available for the reactors.

DESCRIPTION OF THE PREFERRED EMBODIMENT

Figure 1:
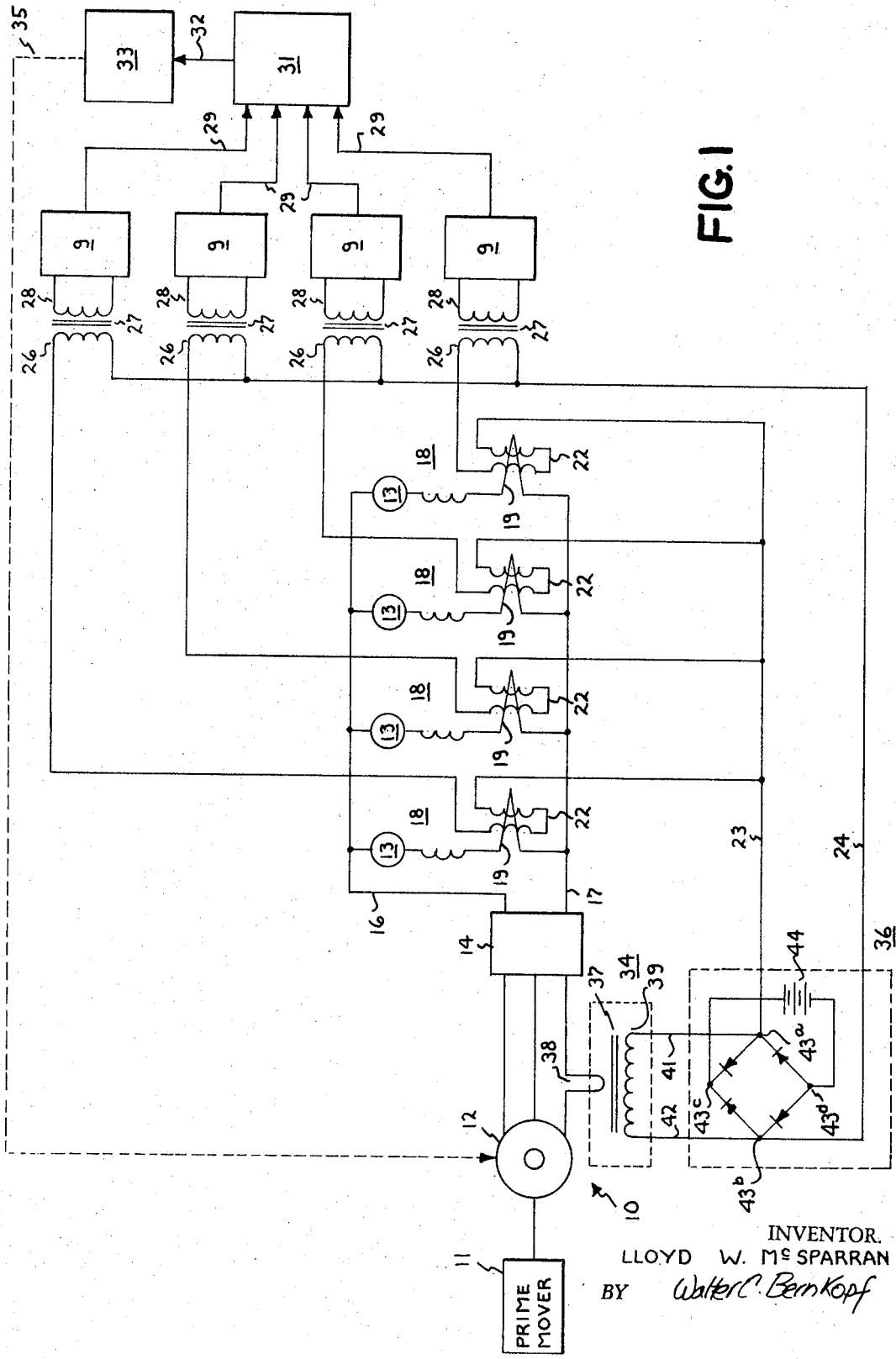
FIG. 1 is a simplified schematic view of the electrical circuitry in the preferred embodiment with the traction motors connected in parallel configuration.

Referring now to FIG. 1, the invention is indicated generally at 10 which shows a prime mover 11, such as a diesel engine or the like, adapted to drive a traction alternator 12 which provides electrical energy through a rectifier system 14 to a plurality of d-c series traction motors, each indicated generally at 13. The traction motors are all shown connected in parallel to the rectifier output between lines 16 and 17, which is the usual arrangement for higher locomotive speeds.

Associated with each of the traction motors 13 is a saturable reactor 18 of the bus type, which is used to measure the current flow through the respective motors. Each of the saturable reactors comprises at least one current bus connection, (or d-c signal conductor) 19 in series with the traction motor between lines 16 and 17, at least one core (not shown), and at least one a-c primary winding 22. A plurality of current bus connections may be employed as discussed in U.S. Pat. No. 2,543,622 issued to Martin A. Edwards and assigned to the assignee of the present invention; however, the plurality is not essential for the proper operation of this invention. Similarly, reactors of the type having either a single core or a two-core arrangement may be used, although a two-core type is preferred. The a-c primary windings are connected in parallel between a-c energized lines 23 and 24, each having serially coupled therewith a transformer primary winding 26. Each such transformer winding acts as the output of the associated reactor and as the primary winding of a transformer having a core 27 and a secondary winding 28. Each of the secondary windings is energized in response to the output of its associated reactor 18 which in turn is responsive to its respective motor current. The outputs of the secondary windings, 28 pass along leads 29 through respective rectifiers 9 to a comparison circuit 31 which may utilize any of a number of schemes commonly used to compare and average the motor currents, such as that disclosed in U.S. Pat. No. 2,652,555 issued to Russell M. Smith and assigned to the same assignee as the present application. The comparison circuit output 32 is applied to the excitation field circuit 33 which is responsive thereto to increase or decrease the excitation to the traction alternator 12 along line 35. The illustration has been greatly simplified with only a schematic representation being shown to represent this portion of the circuitry; the particular circuitry employed is not critical to the proper operation of the invention and may take a number of forms such as that disclosed in the above mentioned U.S. Pat. No. 2,652,555 issued to Russell M. Smith.

Reference is now made to the a-c energized lines 23 and 24 which provide a-c power to the reactors 18. Alternating current is supplied to these lines by a current transformer 34, with the corresponding voltage being controlled by a voltage limiting circuit 36. The current transformer comprises a core 37, a primary coil 38 serially connected with one leg of the polyphase traction alternator output, and a secondary coil 39. The secondary coil is connected by leads 41 and 42 to the lines 23 and 24 to provide a-c power thereto. The fact that the voltage remains uniform and is essentially square instead of pulsing or spiking to a high peak voltage on each half cycle is important since a high peak voltage could be hazardous to maintenance personnel and it could cause a breakdown of the insulation on the control winding 22 of the measuring reactor 18.

The voltage limiting circuit 36 comprises a full bridge rectifier 43 having two of its terminals 43 a and 43 b connected in parallel to leads 41 and 42 respectively, and having its other two terminals 43 c and 43 d connected in series with a d-c power source 44, such as the vehicle battery. The d-c power source provides a reference voltage for the purpose of limiting the voltage to lines 23 and 24. In this way the current transformer output voltage is limited to 75 volts which serves as the power source for the reactors 18. It should be noted that there are other ways of limiting the voltage besides that of using a bridge rectifier and the vehicle battery; for example, zener diodes, thyrector diodes or thyrite devices may be employed for the same purpose.

In operation, the current required in the primary winding 22 of each of the reactors 18 is proportional to that in the associated current bus connection 19. Therefore, at times when the current flow through the traction motors is great, such as when accelerating at low speeds, more a-c current is required from the current transformer. Likewise, at such times the traction alternator will be required to produce more current to satisfy the demands of the traction motors. Accordingly, the current produced by the current transformer will increase in proportion to that of the traction alternator, thus satisfying the demands of the reactor primary windings. Such an arrangement thus ensures that there will always be sufficient current available to allow the reactors to properly operate.

Figure 2:
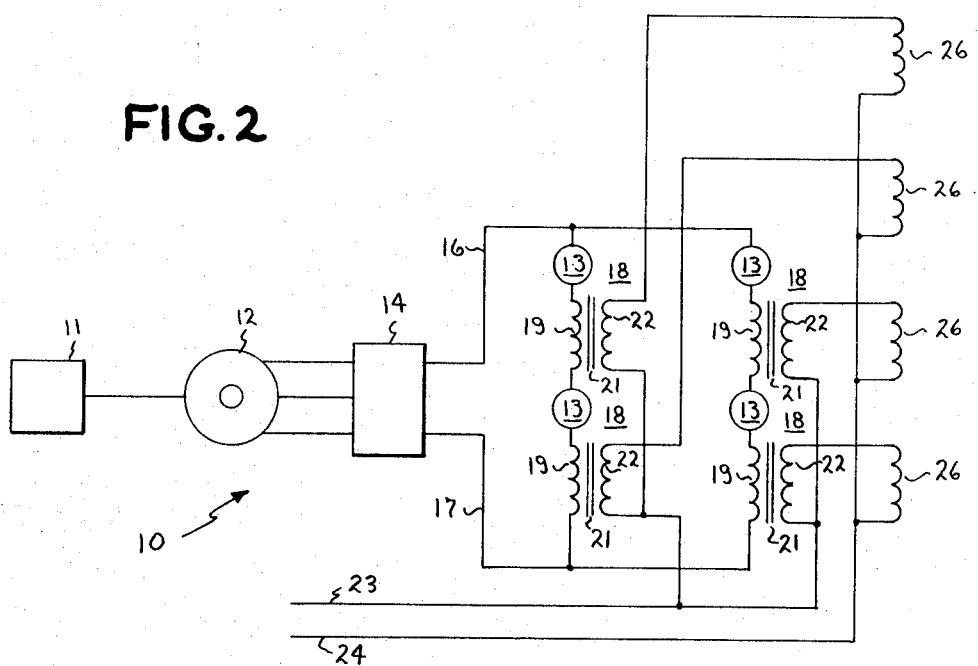
FIG. 2 is a schematic view showing the traction motor and associated current measuring reactor portion of the preferred embodiment with traction motors connected in a series parallel circuitry.

During operating periods of low speed a greater amount of current is required by the traction motors 18, and it is common practice to connect them in a series-parallel relationship, as illustrated in FIG. 2, during this period. The current demand is then only half of that as when connected in parallel as shown in FIG. 1. For example, a typical traction motor may require up to 1800 amperes of current when operating at low speeds. When connected in parallel the total current demand on the traction alternator may reach 7200 amperes, whereas the series-parallel arrangement would require only half the current output or 3600 amperes from the alternator.

The a-c current required to operate each of the reactors is proportional to the d-c current flow through its associated motor armature at a given instant. A typical design would require one ampere of current for each 1000 amperes of d-c current through the motor. The reactors associated with the traction motors, however, must remain connected in parallel to obtain the representative current signals, and thus the ratio of current required by the reactors to that being provided to the motors by the traction alternator is lower when connected as shown in FIG. 2 than as shown in FIG. 1. For example, in the parallel arrangement of FIG. 1, when the maximum current demand of 1800 amperes is made by each motor, 7200 amperes is provided by the alternator and there is a requirement of 7.2 amperes to be provided to the reactor primaries, or a ratio of 1 to 1000. But in the series-parallel arrangement of FIG. 2 when the maximum current demand of 1800 amperes is made by each motor, only 3600 amperes is provided by the alternator and there is still a requirement of 7.2 amperes to the reactors, or a ratio of 1/500. In such an arrangement, the current transformer must provide one ampere of a-c square wave current for every 500 amperes of d-c current being delivered to the motors by the traction alternator.

Figure 3:
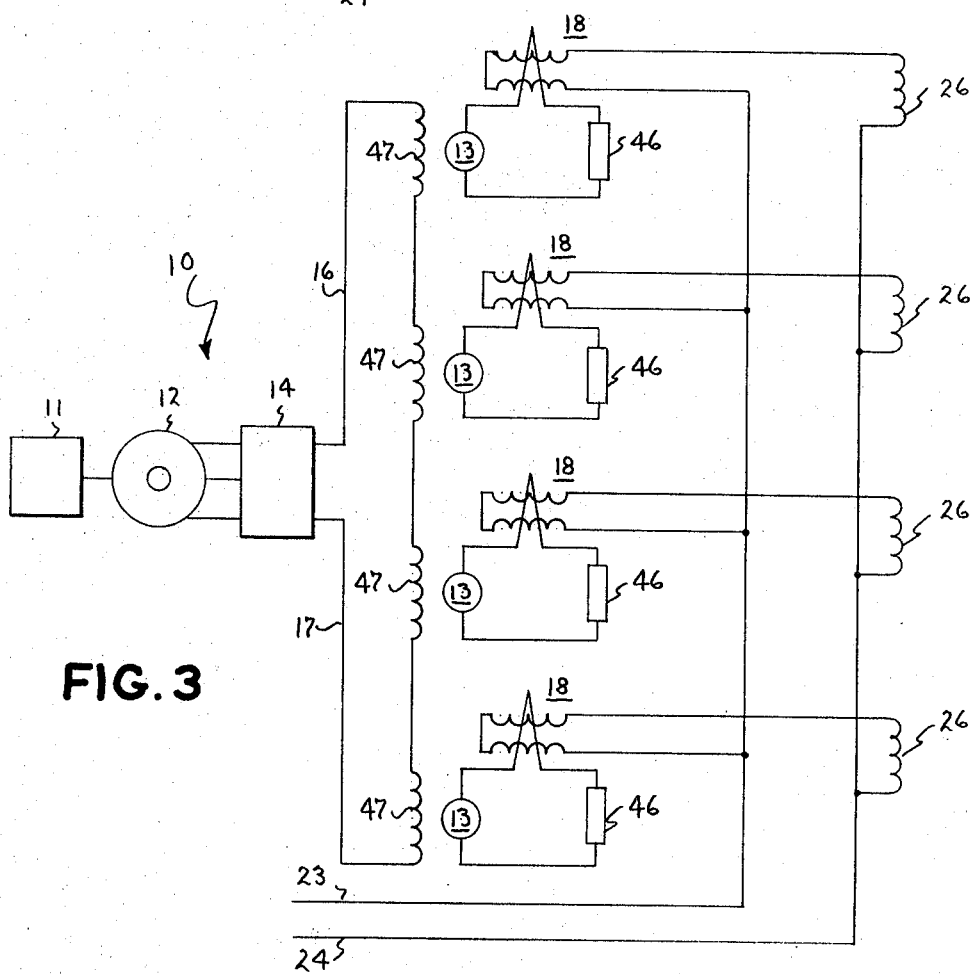
FIG. 3 is a schematic view of the traction motor and current measuring reactor portion of the preferred embodiment during a condition of dynamic braking.

The smallest ratio which occurs is that during dynamic braking at high speeds, wherein a relatively low current is being produced by the traction alternator and a relatively high amount of a-c current is required by the reactors 18. The arrangement used during periods of dynamic braking is illustrated in FIG. 3. The traction motors are then used as generators with the power being dissipated by the resistors 46.

As shown in FIG. 3 the motor fields are connected in series across the rectifier output during dynamic braking. Each traction motor 13 is connected in a series circuit including the d-c signal conductor 19 and a braking resistor 46. The output signals to the transformer primaries 26 are dependent upon the amount of current being generated by the individual motors which in turn is dependent upon their individual rotational speeds. Thus, representative current signals are derived for comparison and subsequent control.

For a given motor armature current limit the limit of field current being delivered to the motor fields 47 is a function of motor armature speed. As the speed increases the field current limit decreases. Typically, where the motor armatures have a current limit of 700 amps and the speed of the traction vehicle is 30 mph, the corresponding field current is 560 amperes. In this condition, each of the reactors requires an a-c current of 0.7 amps, and a total of 2.8 amperes is required for the combination. The ratio of that to the current being delivered by the alternator is 2.8/560 or 1/200, which is the lowest ratio occuring during any particular mode of operation where loss of adhesion is likely to occur. The current transformer is thus designed to meet this requirement by using the proper windings ratio, thereby ensuring that sufficient a-c current is always available to the reactors. During time periods when the current transformer is producing more current than is required, the excess is directed through the voltage limiting circuit to recharge the vehicle battery. In the case of the preferred embodiment, the current magnitude and ratios described herein are given by way of example and the scope of the invention is not to be limited thereto. It may be desirable to connect a voltage breakdown device across secondary winding 39. This precludes the existence of an excess voltage across winding 34 in the event the voltage winding circuit 36 fails.

What I claim as new and desire to secure by Letters Patent of the United States are:

1. In a propulsion control system for a traction vehicle having a d-c traction motor means drivably connected to associated wheel and axle assemblies, wherein the output of a-c generating means is coupled through rectifying means to apply a rectified a-c output to said traction motor means, the combination comprising:
   a. current measuring means having at least one core, at least one d-c signal conductor and an a-c primary winding, said d-c signal conductor being serially connected in the armature circuit of said motor means;
   b. a current transformer having a primary and a secondary winding said primary winding being serially coupled with said a-c generator output, and said secondary winding being serially coupled with said a-c primary winding; and
   c. load responsive means serially coupled to said secondary winding and said a-c primary winding to provide an indication of motor armature current.

2. A propulsion control system as defined in claim 1 and including voltage limiting means coupled across said secondary winding wherein said voltage limiting means comprises a full bridge rectifier having two of its terminals connected in parallel across said secondary winding of said current transformer, and having its other two terminals connected serially with a constant d-c power source.

3. A propulsion control system as defined in claim 1 and including means for applying the output of said current measuring means to control the output of said a-c alternator.

4. In a propulsion control system for a traction vehicle having a-c generating means whose output is applied through rectifying means to a plurality of d-c traction motors connected in a parallel configuration, wherein each of said traction motors is drivably connected to a wheel and axle assembly, the combination comprising:
   a. a plurality of current measuring reactors, each of said reactors having at least one core, at least one d-c signal conductor and an a-c primary winding, said d-c signal conductor of each reactor being serially connected in the armature circuits of one of said traction motors wherein each of said current measuring reactors is adapted to produce an output indicative of its associated motor armature current;
   b. a current transformer having a primary and a secondary winding, said primary winding being serially coupled with said a-c generator output and said secondary winding being connected in parallel to each of said a-c primary windings; and
   c. means for applying the outputs of said plurality of current measuring reactors to control said a-c alternator output so as to reduce wheel slip of said traction vehicle.

5. A propulsion control system as defined in claim 4 and including voltage limiting means coupled across said secondary winding to limit the voltage across said secondary winding.

6. A propulsion control system as defined in claim 5 wherein said voltage limiting means comprises a full bridge rectifier having two of its terminals connected in parallel across said secondary winding of said current transformer, and having its other two terminals connected serially with a constant d-c power source.

* * * * *